United States Patent
Onggosanusi et al.

(10) Patent No.: US 8,139,678 B2
(45) Date of Patent: Mar. 20, 2012

(54) HIGH DATA RATE CLOSED LOOP MIMO SCHEME COMBINING TRANSMIT DIVERSITY AND DATA MULTIPLEXING

(75) Inventors: Eko Onggosanusi, Allen, TX (US); Anand G. Dabak, Plano, TX (US); Timothy M. Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/970,167

(22) Filed: Dec. 16, 2010

(65) Prior Publication Data

US 2011/0080976 A1    Apr. 7, 2011

Related U.S. Application Data

(62) Division of application No. 12/603,127, filed on Oct. 21, 2009, now Pat. No. 7,876,854, which is a division of application No. 11/468,394, filed on Aug. 30, 2006, now Pat. No. 7,715,798, which is a division of application No. 10/301,392, filed on Nov. 21, 2002, now Pat. No. 7,181,167.

(60) Provisional application No. 60/331,718, filed on Nov. 21, 2001, provisional application No. 60/339,704, filed on Dec. 13, 2001, provisional application No. 60/343,424, filed on Dec. 20, 2001.

(51) Int. Cl.
*H04L 27/00* (2006.01)

(52) U.S. Cl. ........ 375/299; 375/135; 375/295; 375/260; 375/146; 455/91; 455/129; 455/272; 455/273; 455/500

(58) Field of Classification Search .......... 455/444–453, 455/69, 562.1
See application file for complete search history.

(56) References Cited

U.S. PATENT DOCUMENTS

| 6,084,928 A * | 7/2000 | Kuwahara | 375/347 |
| 6,888,809 B1 * | 5/2005 | Foschini et al. | 370/334 |

* cited by examiner

*Primary Examiner* — Dai A Phuong
(74) *Attorney, Agent, or Firm* — Ronald O. Neerings; Wade James Brady, III; Frederick J. Telecky, Jr.

(57) ABSTRACT

Closed loop multiple-antenna wireless communications system with antenna weights determined by maximizing a composite channel signal-to-interference-plus-noise ratio minimum. Multiplexed symbol streams over subsets of antennas enhance throughout.

3 Claims, 8 Drawing Sheets

HIGH DATA RATE CLOSED LOOP MIMO SCHEME COMBINING TRANSMIT DIVERSITY AND DATA MULTIPLEXING

CROSS-REFERENCE TO RELATED APPLICATIONS

This application is a divisional of prior application Ser. No. 12/603,127, filed Oct. 21, 2009, now U.S. Pat. No. 7,876,854 issued Jan. 25, 2011;
Which was a divisional of prior application Ser. No. 11/468, 394, filed Aug. 30, 2006, now U.S. Pat. No. 7,715,798, granted May 11, 2010;
Which was a divisional of prior application Ser. No. 10/301, 392, filed Nov. 21, 2002, now U.S. Pat. No. 7,181,167, granted Feb. 20, 2007;
which claims priority from Provisional Application No. 60/331,718, filed Nov. 21, 2001, Provisional Application No. 60/339,704, filed Dec. 13, 2001, and Provisional Application No. 60/343,424, filed Dec. 20, 2001.

BACKGROUND OF THE INVENTION

The present invention relates to wireless digital communications, and more particularly to space diversity transmission systems and methods.

Wireless communication systems include a large variety of approaches, such as frequency division multiple access (FDMA), time division multiple access (TDMA), code division multiple access (CDMA), and combinations. FDMA uses separate frequency bands for duplex communication; whereas, TDMA partitions a single frequency band into time slots which as allocated to one or the other end of a communication link. CDMA uses a spread spectrum approach.

Spread spectrum wireless communications utilize a radio frequency bandwidth greater than the minimum bandwidth required for the transmitted data rate, but many users may simultaneously occupy the bandwidth. Each of the users has a pseudo-random code for "spreading" information to encode it and for "despreading" (by correlation) received spread spectrum signals and recovery of information. Such multiple access typically appears under the name of code division multiple access (CDMA). The pseudo-random code may be an orthogonal (Walsh) code, a pseudo-noise (PN) code, a Gold code, or combinations (modulo-2 additions) of such codes. After despreading the received signal at the correct time instant, the user recovers the corresponding information while other users' interfering signals appear noise-like. For example, the interim standard IS-95 for such CDMA communications employs channels of 1.25 MHz bandwidth and a pseudo-random code pulse (chip) interval $T_c$ of 0.8138 microsecond with a transmitted symbol (bit) lasting 64 chips. The recent 3GPP wideband CDMA (WCDMA) proposal employs a 3.84 MHz bandwidth and the CDMA code length applied to each information symbol may vary from 4 chips to 256 chips. Indeed, UMTS (universal mobile telecommunications system) approach UTRA (UMTS terrestrial radio access) provides a spread spectrum cellular air interface with both FDD (frequency division duplex) and TDD (time division duplex) modes of operation. UTRA currently employs 10 ms duration frames partitioned into 15 time slots with each time slot consisting of 2560 chips ($T_c$=0.26 microsecond).

The air interface leads to multipath reception, so a RAKE receiver has individual demodulators (fingers) tracking separate paths and combines the finger results to improve signal-to-noise ratio (SNR). The combining may use a method such as the maximal ratio combining (MRC) in which the individual detected signals in the fingers are synchronized and weighted according to their signal strengths or SNRs and summed to provide the decoding. That is, a RAKE receiver typically has a number of DLL or TDL code tracking loops together with control circuitry for assigning tracking units to the strongest received paths. Also, an antenna array could be used for directionality by phasing the combined signals from the antennas.

Further, UTRA allows for transmit diversity, both open-loop and closed-loop (receiver feedback). The open-loop transmit diversity includes both time-switched transmit diversity (TSTD) and space-time block-coding-based transmit diversity (STTD). Closed loop techniques provide some significant gain over open-loop transmit diversity techniques by using channel state information (CSI) at the transmitter. For FDD the CSI can be made available at the transmitter via a feedback channel; whereas, for TDD the channel can be directly measured at the transmitter by exploiting the reciprocity (uplink and downlink using the same channel).

The current closed-loop transmit diversity transmits only one data stream via all the transmit antennas, hence achieves the maximum diversity gain. However, for a given modulation scheme, its peak data rate is limited. Another possible transmission scheme is to transmit the same number of data streams as the number of transmit antennas. While achieving maximum peak data rate (termed multiplexing gain), the diversity gain of such scheme is limited by the number of receive antennas, especially when the number of receive antennas is the same as the number of transmit antennas (which is typically the case). For instance, when linear detection is used at the receiver, the diversity gain for each steam is Q−P+1, where Q and P are the number of receive and transmit antennas, respectively. Hence, it is sometimes desirable to use a transmission scheme that combines transmit diversity and data multiplexing.

SUMMARY OF THE INVENTION

The present invention provides multi-antenna transmit weighting adapted to a composite channel of physical channel plus equalization and/or interference cancellation.

This has the advantages including increased performance for wireless communications.

BRIEF DESCRIPTION OF THE DRAWINGS

The drawings are heuristic for clarity.

DESCRIPTION OF THE PREFERRED EMBODIMENTS

1. Overview

The preferred embodiment methods determine antenna weightings in closed-loop multi-antenna systems by incorporating the effect of multipath interference as well as the detection scheme used at the receiver for closed-loop transmit diversity weight vector selection. An example of such selection criterion is to maximize minimum signal-to-interference-plus-noise ratio (SINR) of the composite channel (physical channel plus equalization/interference cancellation), where SINR is defined as the ratio between the average power of the desired signal component and the average power of interference plus noise.

Figure 1A:
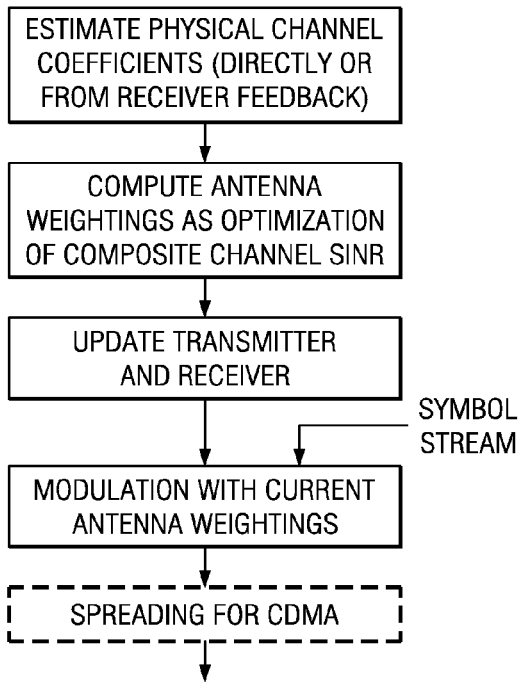
FIGS. 1a-1b are flow diagrams.
Figure 1B:
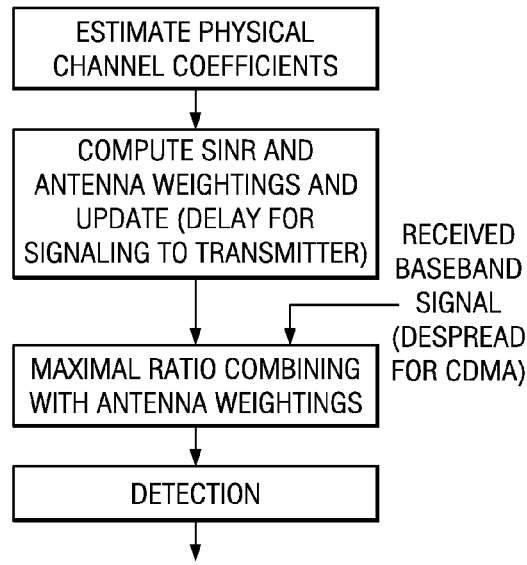

Preferred embodiment transmissions and reception use such antenna weightings with adaptive updating and may include multi-input multi-output (MIMO) systems; see FIGS. 1a-1b flow diagrams. These methods apply to the various wireless communications approaches (CDMA, TDMA, etc.), and extend to multiplexed data stream versions. For a TDD system the transmitter is also a receiver over the same physical channel and thus can directly estimate the channel; whereas, in an FDD system the receiver must provide channel state information to the transmitter.

The determination of antenna weightings derives from optimization of SINR of the composite channel, and thus depends upon the detection method. The detection can be by any convenient method such as maximum likelihood, linear zero-forcing, iterative zero-forcing, linear minimum mean square error, iterative minimum mean square error, and so forth.

For a FDD system the receiver must signal the transmitter. Thus with an FDD CDMA cellular system having mobiles with multiple antennas the antenna weighting signaling with be both uplink and downlink.

Figure 2A:
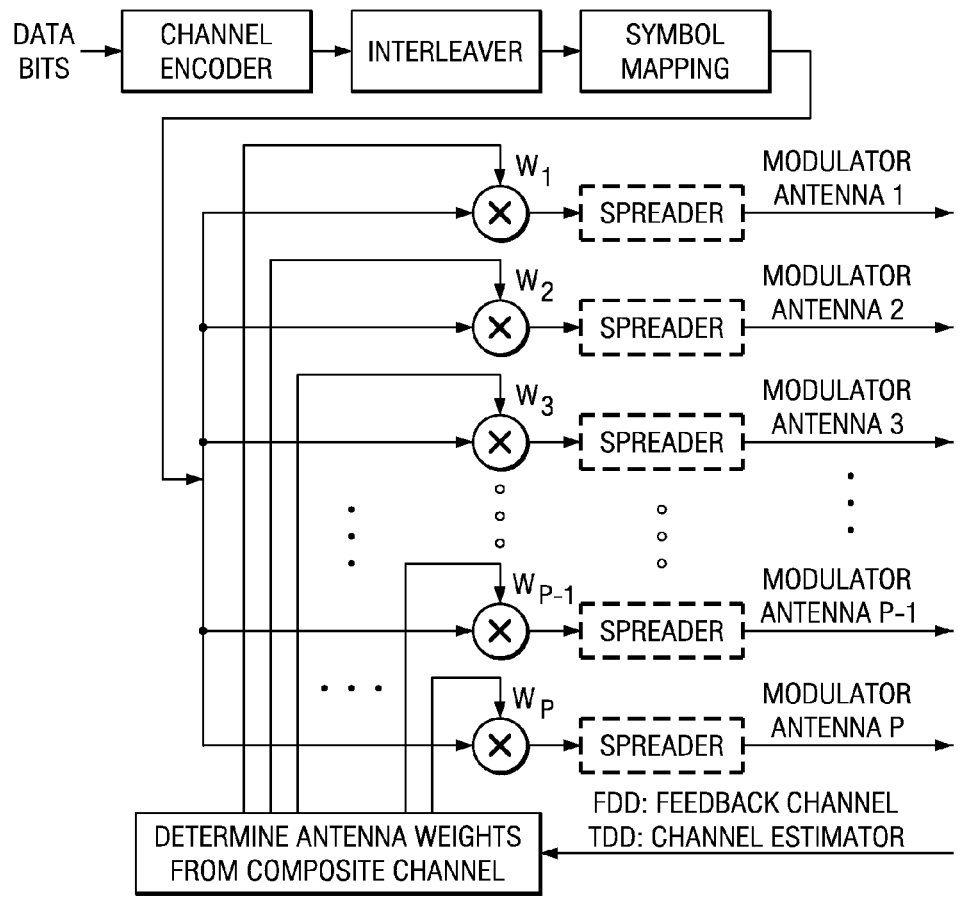
FIGS. 2a-2d illustrate transmitters.
Figure 2B:
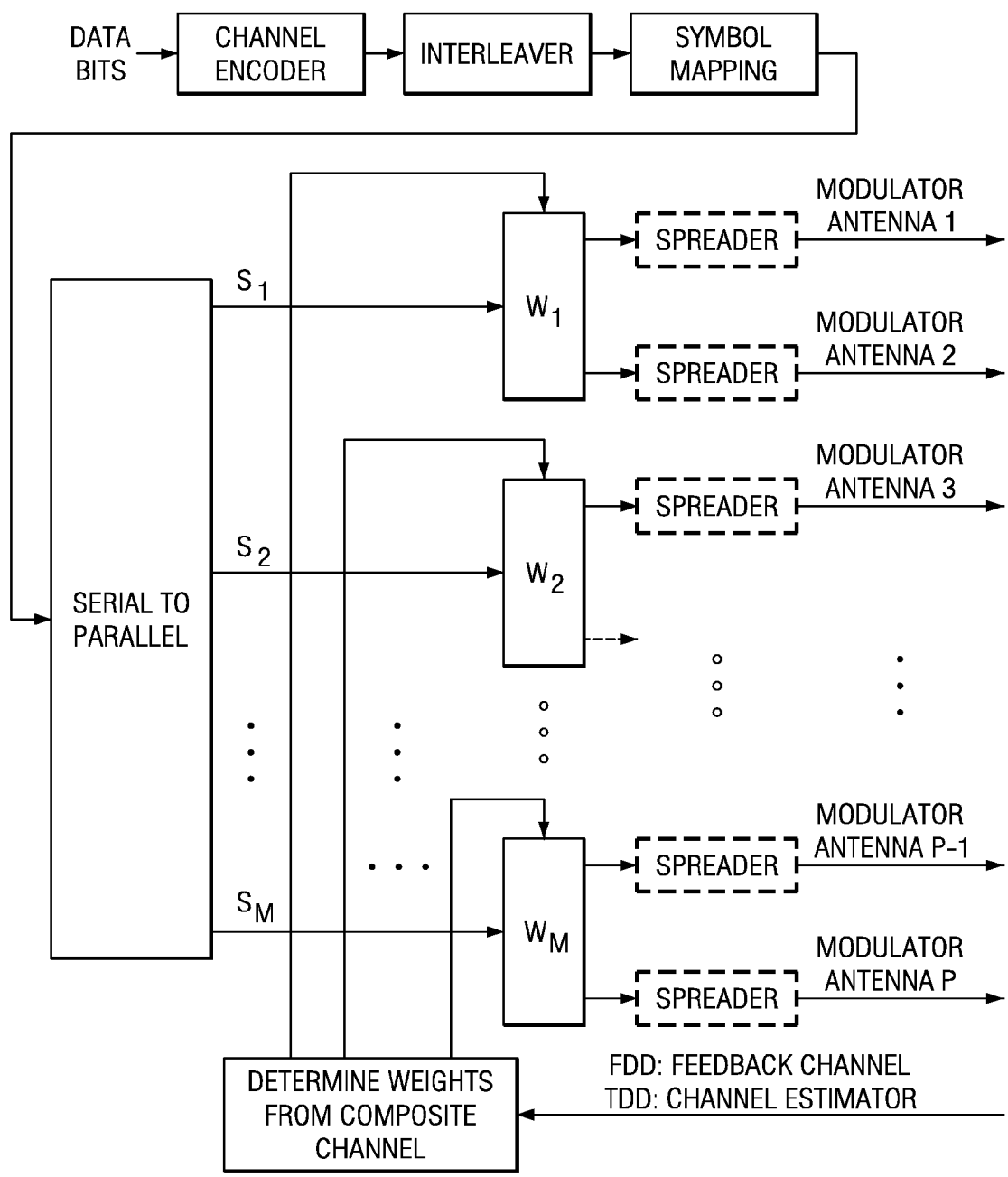
Figure 2C:
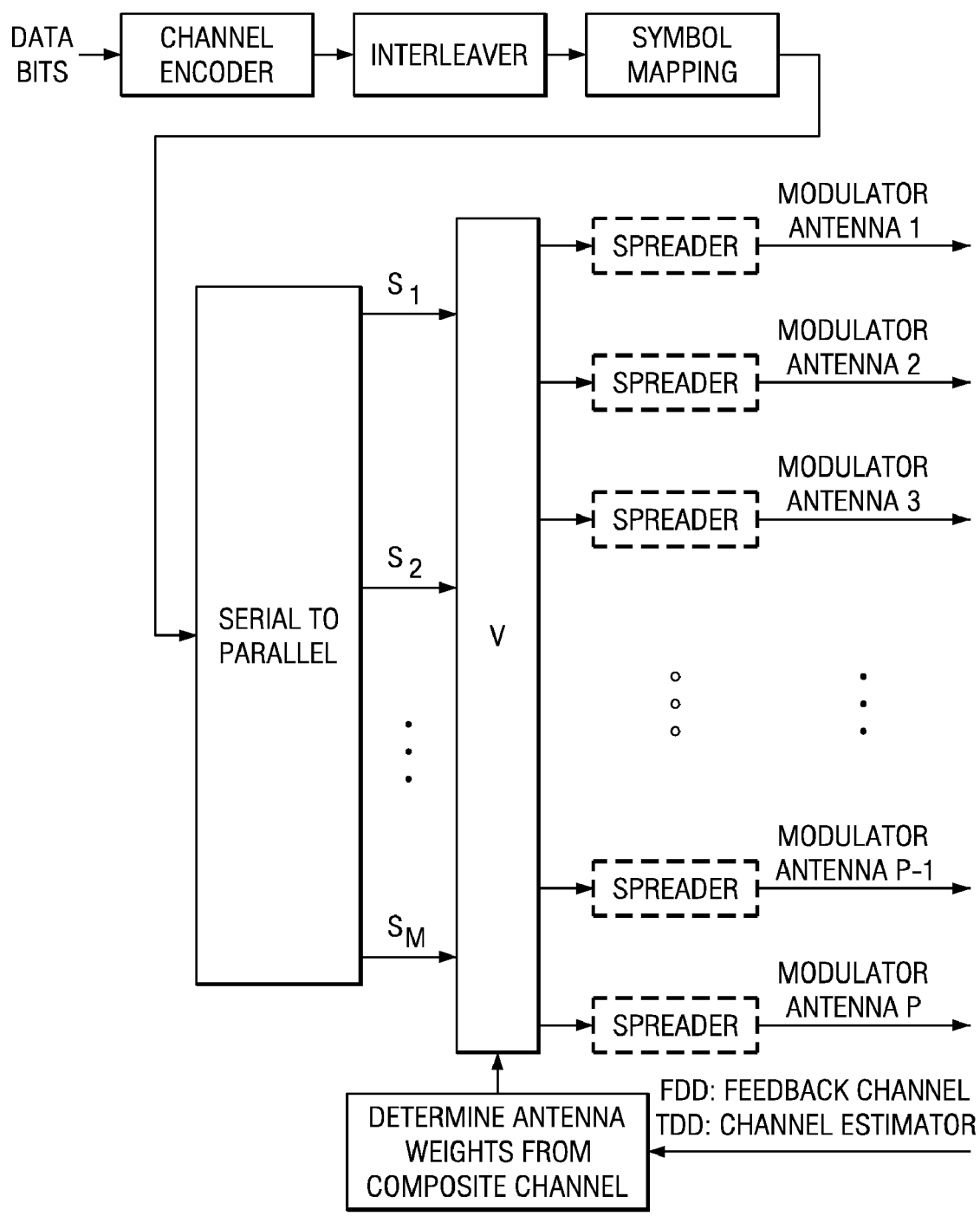
Figure 3A:
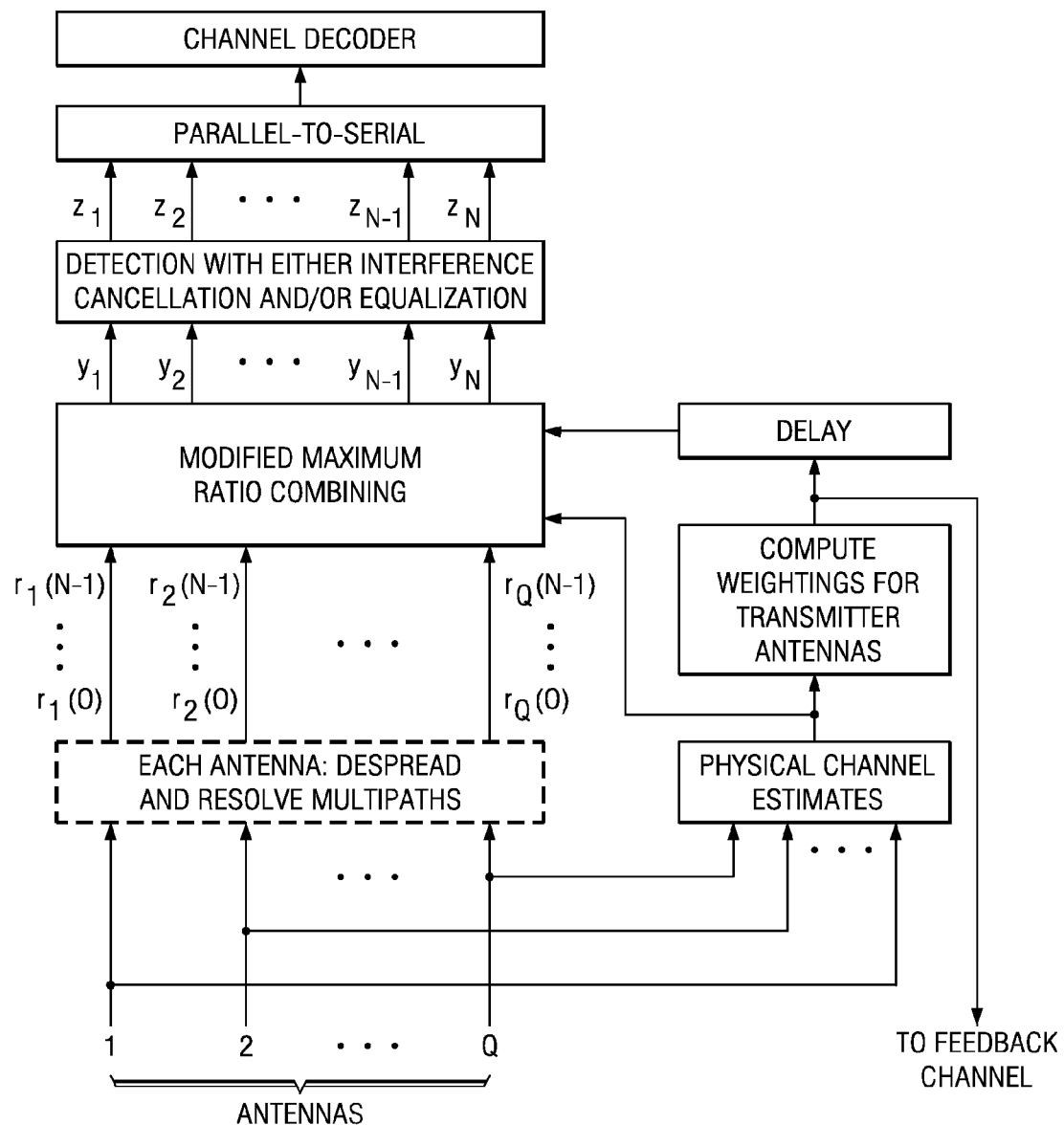
FIGS. 3a-3c show receivers.
Figure 3B:
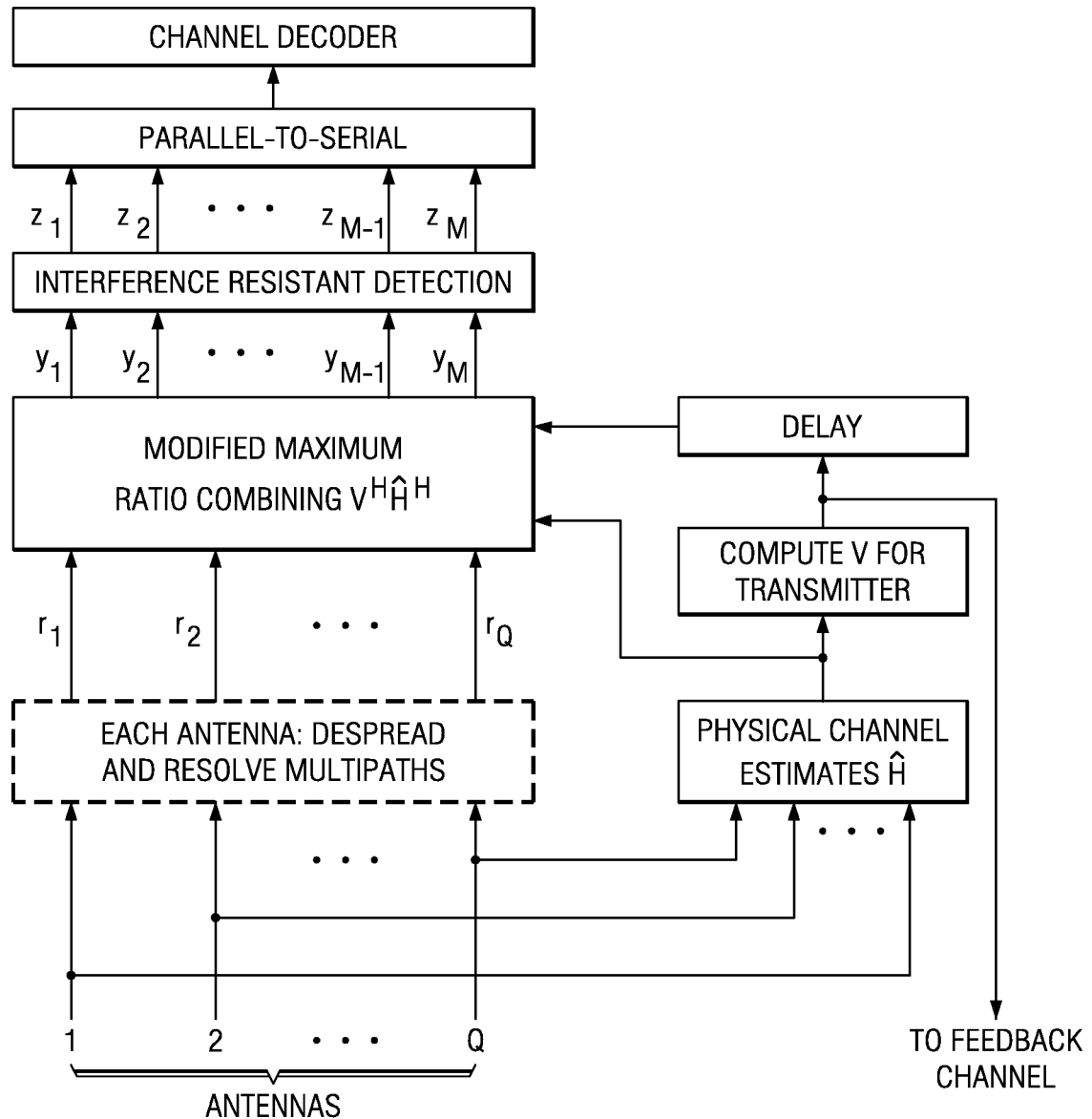

Preferred embodiment communications systems use preferred embodiment encoding and decoding methods. FIGS. 2a-2c illustrate preferred embodiment transmitter functional blocks, and FIGS. 3a-3b show preferred embodiment receiver functional blocks.

In preferred embodiment cellular wireless communications systems base stations and mobile users could each include one or more digital signal processors (DSPs) and/or other programmable devices with stored programs for performance of the signal processing of the preferred embodiment methods. Alternatively, specialized circuitry could be used. The base stations and mobile users may also contain analog integrated circuits for amplification of inputs to or outputs from antennas and conversion between analog and digital; and these analog and processor circuits may be integrated as a system on a chip (SoC). The stored programs may, for example, be in ROM or flash EEPROM integrated with the processor or external. The antennas may be parts of receivers with multiple finger RAKE detectors for each user's signals. Exemplary DSP cores could be in the TMS320C6xxx or TMS320C5xxx families from Texas Instruments.

2. TDMA-Based Single Stream Preferred Embodiments

The single-stream preferred embodiments consider transmission of a single stream of symbols, . . . , s(n), s(n+1), s(n+2), . . . , from P antennas (P≧2) with antenna weights $w_1, w_2, \ldots, w_P$ and reception by Q antennas (Q≧1) with maximal ratio combining (MRC) of multipaths followed by various detection methods. Each detection method leads to a specific method for determination of transmission antenna weightings.

For comparison purposes, first look at the simple case with negligible intersymbol interference. Presume that the channel from P transmit antennas (FIG. 2d) to Q receiver antennas (FIG. 3c) has at most L resolvable paths (L-tap delay line channel model) and that the Q×P channel matrix $H_j$ of attenuations and phase shifts corresponds to the jth delay line tap. With negligible intersymbol interference and a maximal ratio combining (MRC) receiver, the P antenna weightings $w_1, w_2, \ldots, w_P$ applied to the symbol stream for transmission over the P antennas are taken to maximize the reception:

$$w = \arg\max_{u \in S} u^H (\Sigma_{1 \leq j \leq L} H_j^H H_j) u$$

where S denotes the set of all allowable weighting vectors, and u denotes a P-vector of antenna weightings $u_1, u_2, \ldots, u_P$ in S. For example, S could be the set of P-vectors u with complex components and $\|u\|=1$; in this case, w equals the eigenvector of the P×P matrix $(\Sigma_{1 \leq j \leq L} H_j^H H_j)$ having the maximum eigenvalue. Whereas, S is a finite set of complex P-vectors with unit norm for FDD CDMA.

In contrast, the first preferred embodiments presume equalization in the receiver and use channel state information (CSI) for the composite channel (physical channel plus equalizer) to determine the P antenna weightings. FIGS. 2a,3a show a transmitter and receiver for a system with preferred embodiment antenna weighting determinations which adapt to the channel conditions; the "delay" function in the receiver allows time for the transmitter to adjust to antenna weightings as determined by the receiver and signalled to the transmitter. The (q,p)th element of $H_j$ the channel from the pth transmit antenna to the qth receive antenna for the jth delay or multipath. Let . . . , s(n), s(n+1), s(n+2), . . . denote the stream of transmitted symbols.

First, for a TDMA system the received baseband discrete-time signal (sampled at the symbol rate, extension to sampling at sub-symbol rate is straightforward) is:

$$r(n) = \begin{bmatrix} r_1(n) \\ r_2(n) \\ \ldots \\ r_Q(n) \end{bmatrix} = \sum_{0 \leq j \leq L-1} H_j w s(n-j) + \text{noise}(n)$$

where w is the P-vector of weights used at the transmitter and the L taps are relabeled $0 \leq j \leq L-1$ to coincide with the corresponding delay. (Code-division differs from the foregoing time-division in that despreading in code-division allows direct tracking of multipaths and replacement of the tapped delay line of time-division with a receiver having multiple tracking units.)

Collect a sequence of N received samples to form one detection window:

$$r = \begin{bmatrix} r(0) \\ r(1) \\ \ldots \\ r(N-1) \end{bmatrix} = H(I_N \otimes w)s + \text{noise}$$

where $$H = \begin{bmatrix} H_0 & 0 & 0 & \ldots & 0 & 0 & \ldots & 0 \\ H_1 & H_0 & 0 & \ldots & 0 & 0 & \ldots & 0 \\ H_2 & H_1 & H_0 & \ldots & 0 & 0 & \ldots & 0 \\ \vdots & \vdots & \vdots & \ddots & \vdots & \vdots & & \vdots \\ H_{L-1} & H_{L-2} & H_{L-3} & \ldots & H_0 & 0 & \ldots & 0 \\ 0 & H_{L-1} & H_{L-2} & \ldots & H_1 & H_0 & \ldots & 0 \\ \vdots & \vdots & \vdots & & & & \ddots & \\ 0 & 0 & 0 & \ldots & H_{N-L} & H_{N-L-1} & \ldots & H_0 \end{bmatrix}$$

$$I_N \otimes w = \begin{bmatrix} w & 0 & 0 & \ldots & 0 \\ 0 & w & 0 & \ldots & 0 \\ 0 & 0 & w & \ldots & 0 \\ \ldots & & & \ddots & \\ 0 & 0 & 0 & \ldots & w \end{bmatrix}$$

Thus r is an NQ-vector, H is an NQ×NP block Toeplitz channel matrix, $(I_N \otimes w)$ is an NP×N matrix, and s is the N-vector of transmitted symbols of the detection window: s(0), s(1), . . . , s(N-1). N is presumed larger than L so the lower left N−L triangle of H is all Q×P 0s. Indeed, practical systems may use values such as N=16 or 32 and L=6 Also, presume within a detection window the channel state information (CSI) is constant (not updated) and thus also the weights w are constant within the detection window.

Application of a matched filter (including maximal ratio combining of the tap delays) yields the N×1 output y:

$$y = (I_N \otimes w^H) H^H r$$

More explicitly, (for n<N−L):

$$y(n) = w^H H_0^H r(n) + w^H H_1^H r(n+1) + \ldots + w^H H_l^H r(n+L-1)$$

$$= w^H \{\Sigma_{0 \leq j \leq L-1} H_j^H r(n+j)\}$$

Then in terms of the block of transmitted symbols, s, the output is:

$$y = (I_N \otimes w^H) H^H [H(I_N \otimes w) s + \text{noise}]$$

$$= (I_N \otimes w^H) H^H H (I_N \otimes w) s + (I_N \otimes w^H) H^H \text{noise}$$

Next, we consider various detection methods. Different types of detection methods can be used at the receiver, such as the simple maximum ratio combining (MRC) receiver above. However, this type of receiver is not resistant to multipath interference. Some examples of interference-resistant detection method include the optimal maximum likelihood detection, linear detection (zero forcing or minimum mean square error), and iterative detection (zero forcing or minimum mean square error). The details of each detection method are given below.

The weight vector w is selected based on a criterion that takes into account the effect of multipath interference. There are a number of possible criteria that can be used, including the Rake-based criterion mentioned in Section 1 (which does not fully account for the effect of multipath interference). An example criterion that includes the effect of multipath interference is to select w such that the off-diagonal elements of matrix $(I_N \otimes w^H) H^H H (I_N \otimes w)$ are minimized in some sense (e.g. minimize the sum of off-diagonal terms, minimize the off-diagonal term with maximum magnitude). Notice that this criterion does not depend on the receiver type. Different types of receiver, however, respond differently to multipath interference. Hence, intuitively, the selection criteria that take into account the receiver type (detection method) result in better performance. Such receiver-specific selection criteria will be discussed in the following paragraphs.

In general, the optimal maximum likelihood detection would estimate the transmitted symbols s by ŝ which is the vector of symbols that minimizes the sum of the errors in the received signal on the receiver antennas. That is, $$\hat{s} = \arg\min_s \|r - H(I_N \otimes w) s\|^2$$

where the minimization is taken over the set of possible transmitted symbol vectors which depends on the symbol mapping. The weight vector (w) selection at the receiver can be performed based on symbol error rate (SER) for maximum likelihood detection (which reflects bit error rate or frame error rate of the system). It can be shown that an upper bound of SER is (assuming noise variance is unity)

$$SER \leq \sum_{z \in \Delta} \kappa_z Q\left(\sqrt{\|H(I_N \otimes w) z\|^2 / 2}\right)$$

where $\Delta = \{(u-v): u, v \in S, u \neq v\}$, S is the set of all possible transmitted symbol vectors, $\kappa_z$ is the multiplicity of z in S, and Q(.) is the Gaussian Q-function. This upper bound can be used for selecting w: choose w that minimizes the SER upper bound. But such a maximum likelihood detection becomes computationally intensive with larger antenna systems. Both linear and iterative detectors are based on the idea of interference suppression/-cancellation. Possible methods include zero forcing (ZF) and minimum mean square error (MMSE). In the following, the linear MMSE (LMMSE) and iterative MMSE (IMMSE) detectors are explained. A zero-forcing-based detectors (LZF and IZF) can be obtained from MMSE analogs by removing the identity term in the matrix inverse.

Generally, for linear detection use a linear equalizer which transforms the matched filter N-vector window output y into N-vector statistic z=Fy which will estimate transmitted N-vector of symbols s. The N×N matrix F determines the SINR(n) for symbol s(n) in the window, and the minimum SINR(n) determines the overall system error rate (either BER or FER). Consequently, the preferred embodiment methods determine the antenna weightings w to maximize the minimum SINR(n). That is, given equalizer F, pick w so that $$w = \arg\min_{u \in S} \min_{1 \leq n \leq N} SINR(n)$$

where u denotes a P-vector of antenna weightings in the set of allowed weightings S. The dependence of SINR(n) on F and antenna weightings for different detectors is as follows.

For linear zero-forcing (LZF) detection, the N×N equalizer matrix F is found as the inverse of the channel model:

$$F = [G^H G]^{-1}$$

where the NQ×N antenna-weighted channel time-window matrix G is given by:

$$G = H(I_N \otimes w)$$

so $G^H G$ is N×N Hermitian and invertible (a 0 eigenvalue corresponds to either 0 antenna weights, which means no transmission, or a 0 channel, which means no reception). And then SINR(n) is given by:

$$SINR(n)_{LZF} = \rho / [G^H G]^{-1}_{n,n}$$

where $\rho$ is the normalized power per symbol and $[G^H G]^{-1}_{n,n}$ denotes the row n, column n element of the matrix $[G^H G]^{-1}$. Thus the SINRs for the symbols are proportional to the reciprocals of the diagonal elements of the equalizer matrix.

Similarly for linear minimum mean square error (LMMSE) detection the equalizer matrix F is picked so the mean square error (MSE), $E[\|Fy - s\|^2]$, is minimized. The (theoretically derived) linear transformation F is given by:

$$F = [\rho^{-1} I_N + G^H G]^{-1}$$

And the resultant SINR(n) is:

$$SINR(n)_{LMMSE} = \rho / [\rho^{-1} I_N + G^H G]^{-1}_{n,n} - 1$$

And for these two linear detectors the preferred embodiment antenna weightings w are computed to maximize the minimum composite channel SINR; namely, $$w_{LZF} = \arg\min_{u \in S} \min_{1 \leq n \leq N} 1/[(I_N \otimes u^H) H^H H (I_N \otimes u)]^{-1}_{n,n}$$

$$w_{LMMSE} = \arg\min_{u \in S} \min_{1 \leq n \leq N} 1/[I_N + \rho (I_N \otimes u^H) H^H H (I_N \otimes u)]^{-1}_{n,n} - 1.$$

And when the channel coefficients, H, are updated, the antenna weightings, w, can updated for both transmission and reception. For example, in a TDMA cellular telephone system the updating may occur every 0.5-ms.

For nonlinear detection, such as iterative (decision-feedback) equalizers, more computations are required than for the corresponding linear detector. The iterative equalizer is implemented in N steps with each step making a decision on one of the N symbols in the window. Each step includes a linear transformation (ZF or MMSE) followed by a hard decision-feedback (across space and time). That is, a resulting linearly transformed statistic z=Fy is essentially a soft estimate of a component of s.

The SINR for iterative equalizers (IZF or IMMSE) can be computed as for the linear equalizers. Of course, the optimization to determine the antenna weightings w has higher complexity. The IMMSE detector is a sequence of N linear MMSE detection stages, where each detection outputs both a hard and a soft estimate of one of the N symbols in the detection block. The hard estimate is used to regenerate the interference from the so-far estimated symbols which is then subtracted from the received signal, and the difference used for the next linear symbol estimation. More explicitly, presume the symbols are to be estimated in numerical order and let $\hat{s}_k$ denote the hard estimate of the kth symbol $s_k$ and let the N-vector $\hat{s}^{(k)}$ denote the vector with components 1, 2, . . . , k equal to $\hat{s}_1, \hat{s}_2, \ldots, \hat{s}_k$, respectively, and with the remaining N-k components all equal to 0. The iteration's nth step will output $\hat{s}^{(n)}$ from an initialization of $\hat{s}^{(0)}$=0. The nth step (nth linear detector) proceeds as follows:

(a) Regenerate the interference created by previously-estimated symbols $s_1, \ldots, s_{n-1}$ using the channel matrix; that is, form $G\hat{s}^{(n-1)}$. Note that only the first n−1 rows of blocks of G are used because the last N−n+1 components of $\hat{s}^{(n-1)}$ equal 0, so a simpler matrix with rows of blocks n, n+1, . . . N all 0s could be used.

(b) Subtract the regenerated interference of substep (a) from the received signal to have an interference-cancelled signal: $r-G\hat{s}^{(n-1)}$.

(c) Apply the linear equalizer filter F to the matched-filtered (N×NQ matrix $G^H$) interference-cancelled signal from substep (b) to generate a soft output $z^{(n)}$ which estimates the yet-to-be-estimated symbols $s_n, s_{n+1}, \ldots, s_N$. Because the interference cancellation (decision feedback) likely is not perfect, further suppress the interfering symbols by use of a modified linear equalizer filter $F^{(n)}$ which derives from the portion of the channel matrix from sources (antennas) n, n+1, . . . , N. That is, $z^{(n)}=F^{(n)}G^H[r-G\hat{s}^{(n-1)}]$ where the matrix $F^{(n)}$ ignores the portion of the channel relating to the previously-estimated symbols (and analogously G restricted to already estimated symbols and $G^H$ restricted to ignore these channels). The particular form of $F^{(n)}$ depends upon the linear detector type and on assumption about the decision feedback error. In effect, the channel matrix is partitioned into two parts with the part relating to the previously-estimated symbols used to generate the interference estimate plus interference-cancelled signal and with the part relating to the yet-to-be-estimated symbols used for detection of the interference-cancelled signal.

(d) Make a hard decision on the pth component of the soft estimate $z^{(n)}$ to generate the hard estimate $\hat{s}_p$ and update the hard estimate vector $\hat{s}^{(n)}$. In particular, for assumed error-free decision feedback and IZF detection;

$$F^{(n)}G^H = \begin{bmatrix} 0_{(n-1)\times Q} \\ [A_n^H A_n]^{-1} A_n^H \end{bmatrix}$$

where $A_k$ is the NQ×(N−n+1) matrix of the last N−n+1 columns of blocks of G; that is, $A_n=[g_n\ g_{n+1}\ \ldots\ g_N]$ with $g_k$ the kth column (NQ×1) of the NQ×N channel matrix G. Of course, $g_k$ is the channel of the kth symbol from the weighted P antennas to the received NQ-vector. Then the SINR(n) is given by:

$$\text{SINR}(n)=\rho/[A_n^H A_n]^{-1}_{1,1}$$

And the antenna weightings follows as before from maximizing the minimum SINR(n).

Analogously for IMMSE in which $$F^{(n)}G^H = \begin{bmatrix} 0_{(n-1)\times Q} \\ [A_n^H A_n + \rho^{-1} I_{N-n+1}]^{-1} A_n^H \end{bmatrix}$$

and the resulting SINR can be written as $$\text{SINR}(n)=\rho/[A_n^H A_n + \rho^{-1} I_{N-n+1}]^{-1}_{1,1} - 1$$

Ordered iterative detection based on the symbol post-detection SINR is often used to reduce the effect of decision feedback error. Let the detection order be $\pi(1), \pi(2), \ldots, \pi(N)$ where $\pi(\ )$ is a permutation of the N integers $\{1, 2, \ldots, N\}$; that is, the first estimated symbol (hard estimate output of the first step of the iteration) will be $\hat{s}_{\pi(1)}$ and the corresponding nonzero element of $\hat{s}^{(1)}$. The maximum SINR of the components of the first soft estimate $z^{(1)}$, which estimates all P symbols, determines $\pi(1)$. Similarly, the SINRs of the components of $z^{(2)}$, which estimates all of the symbols except $s_{\pi(1)}$, determines $\pi(2)$, and so forth. The partitioning of the channel matrix at each step is analogous.

Note that the soft estimates $z_1, z_2, \ldots, z_N$ for the transmitted block of symbols $s_1, s_2, \ldots, s_N$ (i.e., the output $z^{(n)}_{\pi(n)}$ from the nth step) are used in a sequence decoder, such as a Viterbi decoder or a Turbo decoder, in the form of log likelihood ratios (LLRs).

Other detection schemes are also possible. For example, a receiver consisting of a channel equalizer (to equalize H instead of G) followed by coherent combining with $(I_N \otimes w)$ can be used. In this case, the operation can be described as follows:

$$z=(I_N \otimes w^H)Fr$$

where $F=[\rho^{-1}I_{NQ}+H^H H]^{-1}$ (LMMSE equalizer) or $F=[H^H H]^{-1}$ (LZF equalizer, which requires Q≧P). In this case, channel equalization is performed to remove the effect of multipath (frequency selectivity). Then, coherent combining with the weight vector is performed in symbol-by-symbol basis. Closed-form expressions of SINR can also be derived from the definition. In practice, such channel equalizer can be implemented as an adaptive filter. Note that this scheme is inferior to the previous equalization scheme as this scheme does not exploit the knowledge of w in equalization. Utilizing w as in the previous scheme enables signal space (P-fold) dimensionality reduction.

3. CDMA-Based Single Stream Preferred Embodiments

A CDMA system can have multiple mobile users for the same downlink transmissions from a base station; the uplink channels for different mobiles users are generally different, but for downlink the users experiences a common channel. For the general case of K users after collecting samples of the received signal at the chip rate, the baseband received signal $NN_CQ$-vector (where $N_C$ is the CDMA spreading factor) can be written as:

$$r = \sum_{1 \leq k \leq K} \sqrt{P_k} H_k(C_k \otimes I_P)(I_N \otimes w_k)s_k +$$

-continued $$noise = \begin{bmatrix} \sqrt{P_1}H_1(C_1 \otimes I_P)(I_N \otimes w_1), \\ \sqrt{P_2}H_2(C_2 \otimes I_P)(I_N \otimes w_2), \ldots, \\ \sqrt{P_K}H_K(C_K \otimes I_P)(I_N \otimes w_K) \end{bmatrix} \begin{bmatrix} s_1 \\ s_2 \\ \vdots \\ s_K \end{bmatrix} + noise$$

where K is the number of users, $P_k$ is the power of the kth user, N is the symbol block size, $H_k$ is the $NN_CQ \times NN_CP$ channel matrix of the kth user, $C_k$ is the $NN_C \times N$ CDMA spreading code matrix of the kth user, $w_k$ is the weight vector of user k, and $s_k$ is a block of symbols of user k. In this case multiuser interference cancellation (also known as multiuser detection) is needed. Similar to equalization, linear or iterative interference cancellation (ZF or MMSE) can be used and the SINR can be computed in the same manner as for the time-division case by considering the total multiuser channel matrix $$H_{tot} = [\sqrt{P_1}H_1(C_1 \otimes I_P)(I_N \otimes w_1), \sqrt{P_2}H_2(C_2 \otimes I_P)(I_N \otimes w_2), \ldots, \sqrt{P_K}H_K(C_K \otimes I_P)(I_N \otimes w_K)]$$

so $H_{tot}$ is an $NN_CQ \times NK$ matrix for a Q-antenna receiver. For example, the linear ZF and MMSE multiuser interference cancellation for CDMA are $$z = [z_1^T z_2^T \ldots z_K^T]^T = Fr$$

$$F = [H_{tot}^H H_{tot}]^{-1} H_{tot}^H \text{(LZF), and}$$

$$F = [H_{tot}^H H_{tot} + \sigma^2 I_{NKP}]^{-1} H_{tot}^H \text{(LMMSE)}$$

The SINR for each symbol from each CDMA user can also be defined in the same manner as that for TDMA. Similarly, iterative detectors for CDMA are analogous to that for CDMA. In practice, linear multiuser interference cancellation can be implemented in successive or parallel architecture.

For downlink applications where the $H_k$ are all the same ($H_k$=H) but $w_k$ is user-specific (multiple users) interference cancellation described above is a good alternative. Another possible receiver scheme for user k consists of a channel equalizer (which linearly equalizes only the channel H), the kth user despreader (multiplication with $C_k^H \otimes I_P$), and symbol-by-symbol coherent combining with the weight vector (multiplication with $(I_N \otimes w_k^H)$). Again, the SINR expression for each symbol from user k can be derived from SINR definition. In this downlink scenario, the weighting vectors for all of the users can be jointly selected at the base station maximizing the minimum SINR across all users and symbols (similar to the previous preferred embodiments for equalizers). This ensures that all of the users experience good performance.

For the downlink applications where both the $H_k$ and the $w_k$ are common (one user with multiple codes: $H_k$=H, $w_k$=w), the above interference cancellation and equalization techniques are applicable. In this single-user multi-code downlink scenario, another receiver scheme can be derived by using the following identity:

$$H(C_k \otimes I_P)(I_N \otimes w) = H(I_{NN_C} \otimes w)C_k = H_{eff}C_k$$

The new receiver consists of an equalizer for the effective channel $H_{eff}=H(I_{NN_C} \otimes w)$ followed by a despreader for user k (multiplication with $C_k^H$). For weight vector selection, only one weighting vector needs to be determined, and maximizing the minimum SINR criteria again is used.

For TDMA- and CDMA-based systems, other types of equalizers and/or interference cancellers can be designed for mitigating the effect of multipath interference when closed-loop transmit diversity is used. For each type of multipath interference-resistant receiver, an expression of SINR as a function of the channel realization, spreading code matrices (for CDMA), and weight vectors can be derived and used for preferred embodiment weight vector selection.

4. Multiplexed Streams Preferred Embodiments

The multiplexed stream preferred embodiments combine transmit diversity and multiple data streams to achieve higher data rates. FIGS. 2b-2c illustrate transmitters and FIG. 3b shows a receiver. One data stream coming from the symbol mapper is split into M streams. As with the foregoing preferred embodiments, the multiplexed stream preferred embodiment methods determine the antenna weightings from composite channel characteristics.

In more detail, FIG. 2b illustrates a generic preferred embodiment transmitter with M=P/2 units with each unit having two antennas and transmitting one data stream. Each $W_m$ is a 2×1 weighting vector corresponding to the mth data stream; and the preferred embodiment methods provide composite channel determination of the $w_m$s.

More generally, each unit could have K antennas and thus M=P/K. The number of transmit antennas P must be a multiple of K. Of course, this scheme can be further generalized by accommodating the possibility of each unit having different number of antennas. That is, group n is assigned to $K_n$, antennas where $K_1+K_2+\ldots+K_M=P$, where $1 \leq K_m < P$, $M \geq 2$, and $P > 2$. For simplicity, we assume that all the units have the same number of antennas for the rest of this description (extension to the most general case is obvious for one skilled in the art).

FIG. 2c illustrates preferred embodiments with a P×M linear transformation (weighting matrix) of the M data streams onto the P antennas.

Thus the FIG. 2b transmitter is a special case with weighting matrix V given $$V = \begin{bmatrix} w_1 & 0 & \ldots & 0 \\ 0 & w_2 & \ldots & 0 \\ \vdots & \vdots & \ddots & \vdots \\ 0 & 0 & \ldots & w_M \end{bmatrix}$$

For systems with P transmit antennas the peak data rate is the sum of peak data rates of all of the streams. When all of the data streams share the same modulation-coding scheme, the peak data rate is simply M times the peak data rate dictated by the modulation-coding scheme.

Consider the P-antenna transmitter and Q-antenna receiver system of FIGS. 2c, 3b. Denote the data (symbol) streams $s_1, s_2, \ldots s_M$ by the M-vector s, and denote the Q×P channel by H. For simplicity, assume that the channel is frequency non-selective (single-tap), although extensions to multipath scenarios follow as analogs of the single-stream preferred embodiment systems described above. Then the received Q-vector signal can be written as:

$$r = HVs + noise$$

where the noise is Q-vector AWGN. The Q×M matrix HV is the effective MIMO channel matrix, which includes spatial interference among the symbol streams. To generate sufficient statistics for detection, perform maximal ratio combining (MRC) matched filtering as with the single-stream preferred embodiments:

$$y = V^H H^H r$$

$$= V^H H^H (HVs + noise)$$

Again, various detection methods may be applied; namely, maximum likelihood, zero-forcing (both linear and iterative), and minimum mean square error (both linear and iterative). The maximum likelihood detection solves the following optimization problem:

$$\hat{s} = \arg\min_s \|r - HVs\|^2$$

where the minimization is taken over the set of possible transmitted symbol vectors which depends on the symbol mapping. The linear detection methods apply a linear transformation F to the received y to yield the soft estimation statistic z=F y by choice of F for ZF and MMSE as:

$$F_{LZF} = [V^H H^H HV]^{-1}$$

$$F_{LMMSE} = [V^H H^H HV + I_M/\rho]^{-1}$$

where $\rho$ is the average symbol power in the sense that $E[ss^H] = \rho I_M$.

Iterative detectors are constructed from a series of linear transformations followed by decision-feedback interference cancellation; as described in previous preferred embodiments. Again, the cancellation can be ordered according to criteria such as largest SINR.

The multipath channel aspect is treated as in the previous preferred embodiments. In this case, the SINR metric must incorporate the effect of multipath interference.

The preferred embodiment weighting vectors/matrix determination again minimizes the symbol error rate (SER) for maximum likelihood detection, and maximizes the minimum SINR for linear and iterative detections; although other criteria could be used. And the resultant weighting vectors/matrix found by the receiver can be signaled to the transmitter in the feedback channel for an FDD system but may, optionally, be directly determined by the transmitter for a TDD system. Analogous to the single-stream embodiment, the following SER upperbound can be used:

$$SER \leq \sum_{z \in \Delta} \kappa_z Q\left(\sqrt{\|HVz\|^2/2}\right)$$

where $\Delta = \{(u-v): u, v \in S, u \neq v\}$, S is the set of all possible transmitted symbol vectors, $\kappa_z$ is the multiplicity of z in S, and Q(.) is the Gaussian Q-function. This upper bound can be used for selecting V: choose V that minimizes the SER upper bound. The preferred embodiments for linear and iterative detectors find the weights V by maximization:

$$V = \arg\max_{U \in S} \min_{1 \leq m \leq M} SINR((m; H, U))$$

where SINR(m; H, U) is the signal-to-interference+noise ratio for the mth stream with channel H and weighting matrix U in the set S of allowable weighting matrices. This criterion corresponds to minimizing the system bit error rate (BER).

Closed-form expression of SINR(m; H, U) for different detectors can be obtained.
Define the following:

$A = HU$ (a $Q \times M$ matrix)

$= [a_1, a_2, \ldots, a_M]$ (each $a_m$ is a $Q \times 1$ vector)

$A_m = [a_m, a_{m+1}, \ldots, a_M]$ (a $Q \times (M-m+1)$ matrix)

Then $$SINR_{LZF}((m; H, U)) = \rho/[A^H A]^{-1}_{m,m}$$

$$SINR(m; H, U)_{LMMSE} = \rho/[I_M/\rho + A^H A]^{-1}_{m,m} - 1$$

$$SINR_{IZF}((m; H, U)) = \rho/[A_m^H A_m]^{-1}_{1,1}$$

$$SINR(m; H, U)_{IMMSE} = \rho/[I_M/\rho + A_m^H A_m]^{-1}_{1,1} - 1$$

And for ordered detection in the iterative detectors, the SINR expressions are accordingly modified as previously described.

The foregoing gives the criterion to select the optimal weighting matrix V from the pre-determined set of allowable weighting matrices, $S_V$. Another aspect of preferred embodiment systems is the selection of this set $S_V$ of allowable weighting matrices. As given above, one possibility is to choose the following parameterization of V:

$$V = \begin{bmatrix} w_1 & 0 & \cdots & 0 \\ 0 & w_2 & \cdots & 0 \\ \vdots & \vdots & \ddots & \vdots \\ 0 & 0 & \cdots & w_M \end{bmatrix}$$

where each $W_m$ belongs to a set of allowable (PIM)×1 vectors $S_{wm}$ as described above. There are several variations: (1) when all $w_m$ are distinct, $|S_V| = \Pi |S_{wm}|$, so when all $S_{wm} = S_{w1}$, $|S_V| = |S_w|^M$; (2) all $w_m$ are equal to a single w, and thus $|S_V| = |S_w|$.

Note that V can be any P×M linear transformation, so another possibility is $$V = \begin{bmatrix} R_1 \\ R_2 \\ \vdots \\ R_{P/M} \end{bmatrix}$$

where $R_m$ is a M×M unitary rotation matrix. In particular, for M=2:

$$R_m = \begin{bmatrix} \cos\theta_m & e^{j\phi m}\sin\theta_m \\ -e^{-j\phi m} & \cos\theta_m \end{bmatrix}$$

where $\Phi_m$ and $\theta_m$ can be quantized for low-complexity searching to find V. See the following simulation section.

5. Simulation Results

Figure 2D:
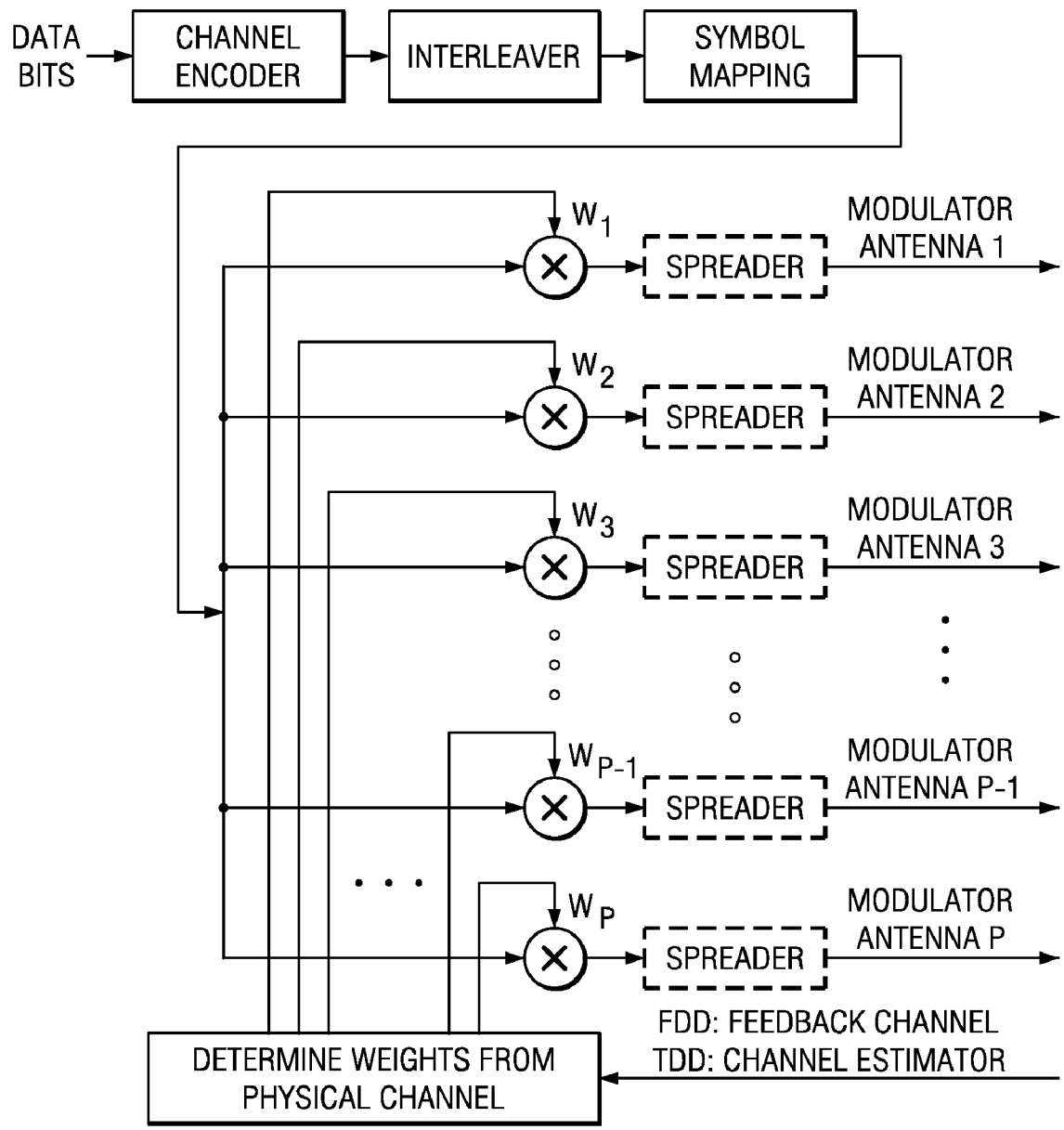
Figure 3C:
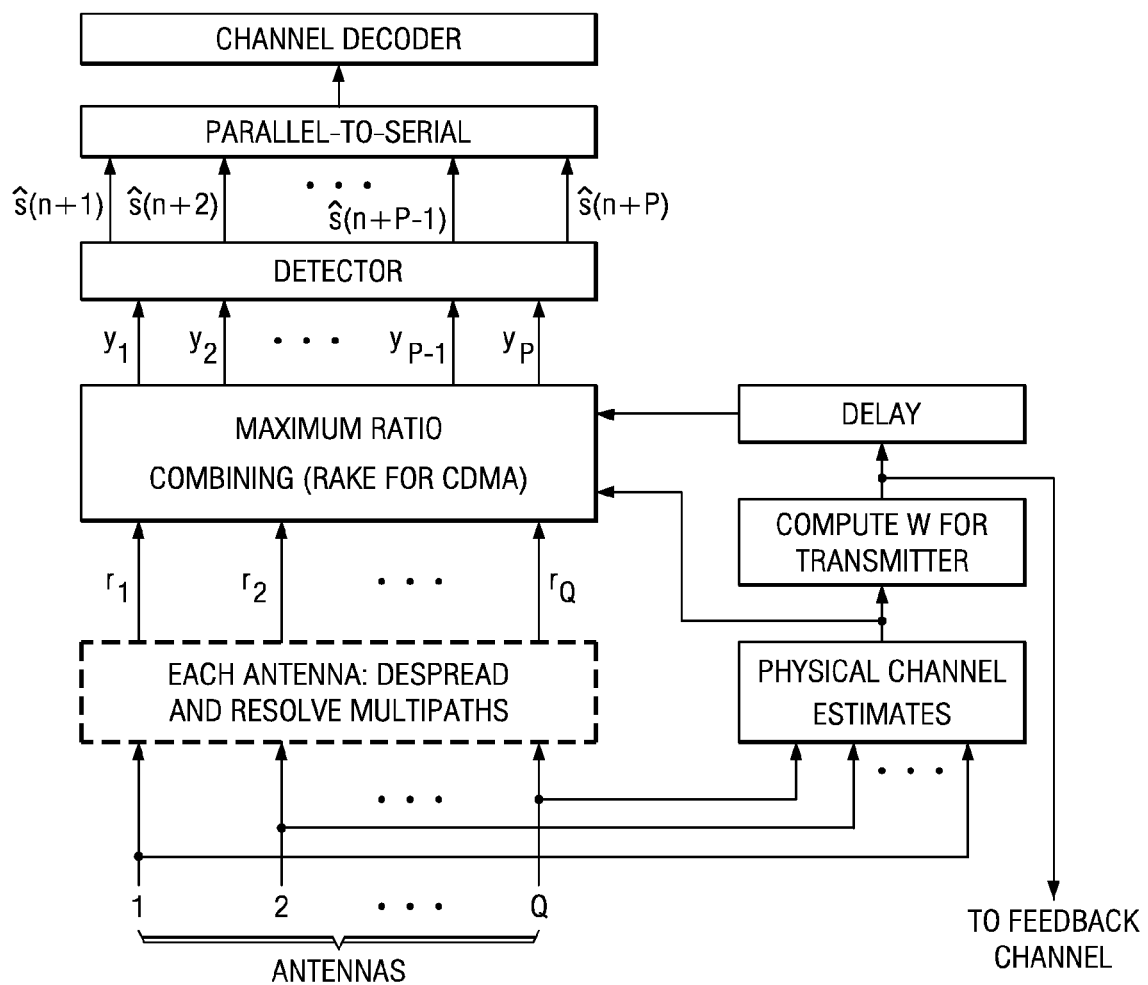
Figure 4:
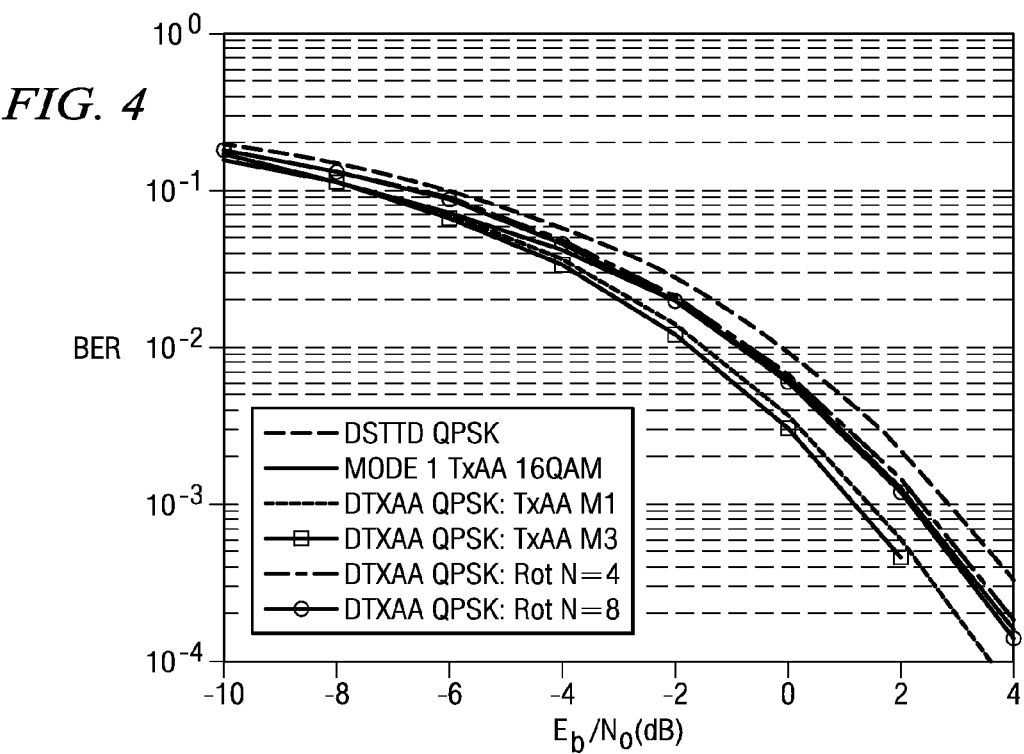
FIGS. 4-5 present simulation results.
Figure 5:
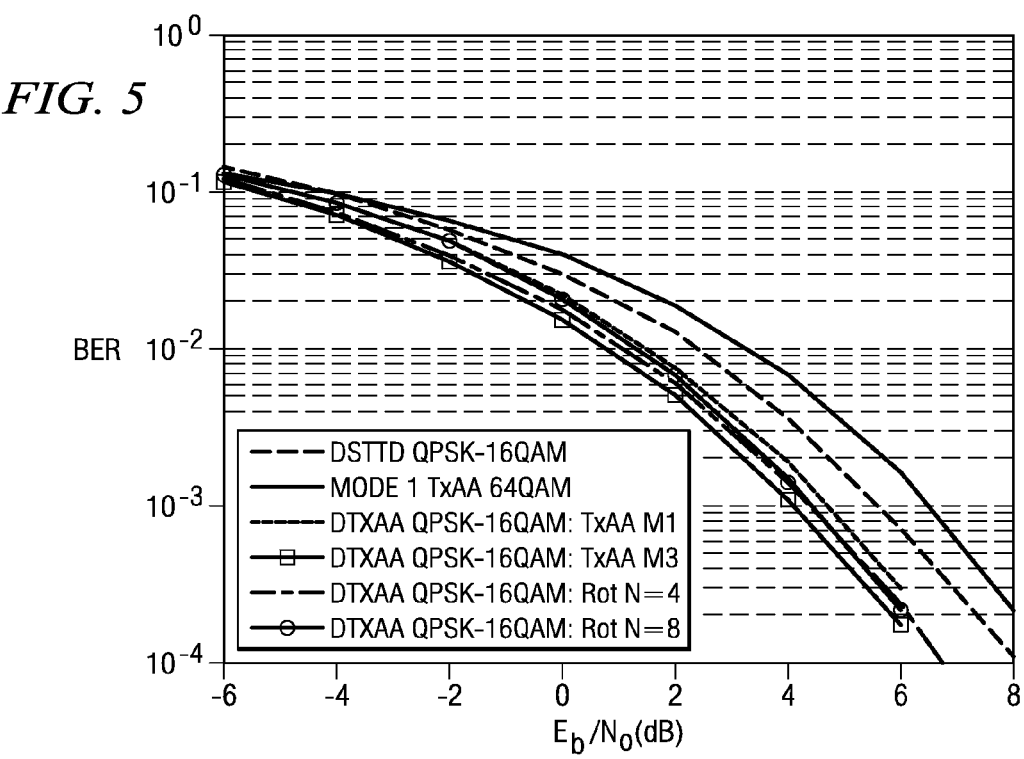

FIGS. 4-5 compare raw BER for the P=Q=4 cases of standard MIMO (64QAM single stream space diversity), a double STTD, and various two-stream preferred embodiments (FIG. 2b) with iterative MMSE detection (with ordering) at 4-bps/Hz and 6-bps/Hz throughput. The curves are: (1) DSTTD: open loop with double STTD; (2) Model: FIG. 2d with weights $w_1 = \frac{1}{2}$, $w_p = \exp(-j\phi_p)$ for p=2, 3, 4 where the $\phi_p$ are uniformly quantized to 2 bits, so the allowable weight space size is $4^3 = 64$; (3) DTXAA . . . M1: weight matrix of two 2×1 phase vectors $w_1$ and $w_2$ with each phase of 2-bit quantization, so a total weight space size of 16; (4) DTXAA M3: weight matrix of two 2×1 vectors $w_1$ and $w_2$ with each vector of 1-bit magnitude and 2-bit phase quantization, so a total weight space size of 64; (5) DTXAA . . . Rot N=4: weight matrix (FIG. 2c) is 2×1 of 2×2 blocks with each 2×2 block a rotation by $\theta_m$ with $\theta_m$ uniformly quantized in range $[0, \pi/2)$ to 4 values, so the weight space size is 16; and (6) DTXAA . . . Rot N=8: weight matrix is 2×1 of 2×2 blocks with each 2×2 block a rotation by $\theta_m$ with $\theta_m$ uniformly quantized in range $[0, \pi/2)$ to 8 values, so the weight space size is 64. Observe that for the same set size, the DTXAA (preferred embodiments) outperforms the conventional by up to 2.5 dB. Even with smaller set size, the preferred embodiments still outperform the conventional by up to 2.2 dB. Note that curve (4) performs the best.

6. Modifications

The preferred embodiments can be modified in various ways while retaining the features of antenna weightings determined from the composite channel.

For example, as mentioned before, other receiver schemes can be used, which result in different error rate or SINR dependence upon the channel and weight vectors. For TDMA and CDMA systems, the channel may exhibit significant frequency selectivity due to multipath effect. In this case, the weight selection criterion must incorporate the effect of multipath interference as well as the receiver scheme that is used to suppress multipath interference. Finally, this scheme can also be applied in OFDM-type systems, where the scheme is applied for each sub-carrier or across sub-carriers.

What is claimed is:

1. A wireless transmitter comprising:
A. symbol mapping circuitry having a data symbol output;
B. serial to parallel circuitry having an input coupled with the data symbol output and having plural symbol stream outputs;
C. multiplier circuits, one for each symbol stream output, each multiplier circuit having a symbol input, an antenna weight input, and an antenna output, the symbol input being coupled with a symbol stream output;
D. antenna units, each coupled with the antenna output of one multiplier circuit; and
E. antenna weight circuitry having plural antenna weight outputs, each antenna weight output being coupled with one antenna weight input, the antenna weight circuitry producing weight signals on the antenna weight outputs in accordance with a matrix V, where $$V = \begin{bmatrix} R_1 \\ R_2 \\ \vdots \\ R_{PbyM} \end{bmatrix}$$

and $R_m$ is a M by M unitary rotation matrix, in which for M=2:

$$R = \begin{bmatrix} \cos\theta_m & e^{j\phi_m}\sin\theta_m \\ -e^{j\phi_m}\sin\theta_m & \cos\theta_m \end{bmatrix}$$

where $\phi_m$ and $\theta_m$ can be quantized for low-complexity searching to find V.

2. The wireless transmitter of claim 1 in which the transmitter is included in user equipment.

3. The wireless transmitter of claim 1 in which the transmitter is included in a mobile device.

* * * * *